Dec. 19, 1933.  W. C. STARKEY  1,939,730
SPRING CLUTCH
Filed April 6, 1931
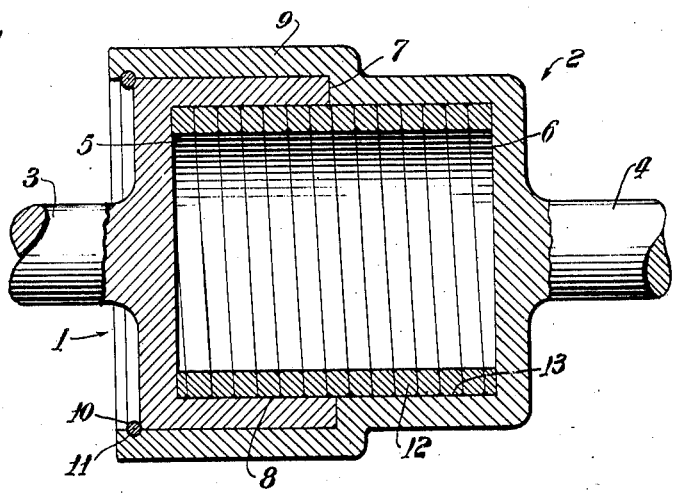
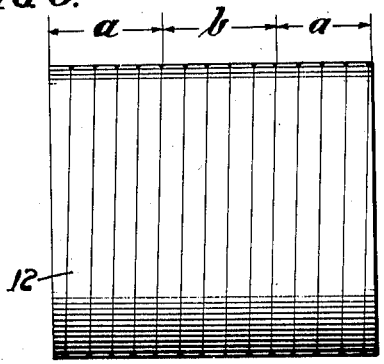
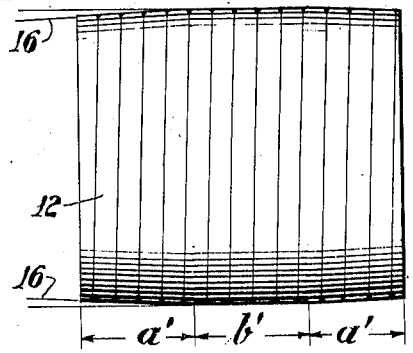
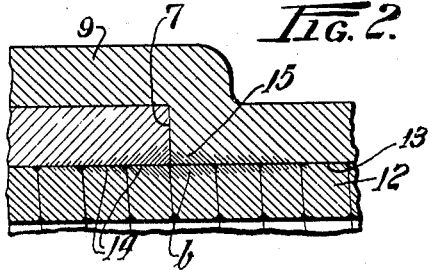
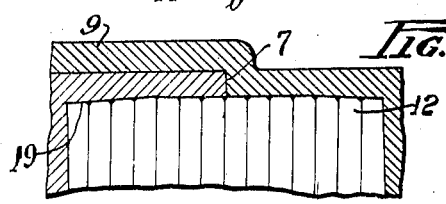
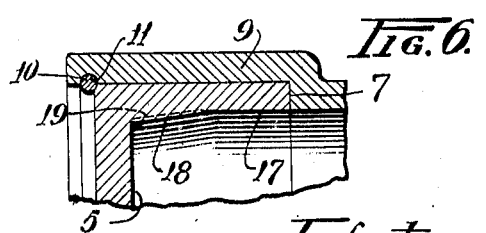
Inventor:
William Carleton Starkey,
By: Arthur McNelson
Atty.

Patented Dec. 19, 1933

1,939,730

UNITED STATES PATENT OFFICE 1,939,730

SPRING CLUTCH

William Carleton Starkey, Indianapolis, Ind., assignor to L. G. S. Devices Corporation, Indianapolis, Ind., a corporation of Indiana Application April 6, 1931. Serial No. 527,965

14 Claims. (Cl. 192—41)

This invention relates to improvements in spring clutches and it consists of the matters hereinafter described and more particularly pointed out in the appended claims.

The type of spring clutch with which my invention is more particularly concerned is of the kind embodying two relatively rotatable members formed to provide a clutch surface with which a coil spring is adapted to clutchingly engage to operatively connect said members together upon a relative rotation between said members in the proper direction. Such a structure is often employed in indexing devices, overrunning clutches, manual shift clutches and centrifugal clutches.

In each instance, the several turns of the clutch spring near each of its ends have as there sole function, that of frictionally gripping the usually cylindrical walls of those portions of the two clutch members providing the clutching surface. One or more turns of the clutch spring between said several turns at the ends thereof has quite a different function and that is to change its diameter to engage with intimate contact with those meeting ends of the clutch members providing the clutching surface mentioned. Where the two meeting ends of said members are each provided with a recess which coact to form a clutch spring pocket, the spring employed is caused to expand into clutching engagement with that part of said surface adjacent said meeting ends. The surface of said part of the spring or the associated clutch surface as formed by the meeting ends of the clutch members, to be ideal, should be of such a molecular structure as to be highly resistant to wear or marring.

The primary object of the invention is to provide in a spring clutch of this kind, certain parts of the coacting surfaces of the spring and clutch members, with relatively hard engaging surfaces in the vicinity of the plane of the meeting ends of the clutch members whereby wear is there materially reduced if not entirely eliminated and wherein other portions of said spring and clutch members have a relatively softer surface to provide a high coefficient of friction.

Another object of the invention is to provide a spring for a clutch of this kind wherein certain turns thereof at the midportion of the spring are made relatively hard to withstand change of its molecular structure under wear in use and wherein certain end turns on each side of said midportion are made relatively softer so as to have a better frictional engagement with the associated part of the clutch members.

These objects of the invention as well as others, together with the many advantages thereof will more fully apear as I proceed with my specification.

In the drawing:—

Fig. 1 is a longitudinal vertical sectional view through a conventional type of spring clutch embodying my invention.

Fig. 2 is a detail fragmentary sectional view on an enlarged scale of parts shown at the top central portion of Fig. 1.

Fig. 3 is a view in elevation of a clutch spring employed in my improved clutch and illustrates the manner in which certain parts are treated before hardening another part thereof.

Fig. 4 is a view in side elevation showing another manner in which a clutch spring embodying a feature of my invention may be formed.

Fig. 5 is a detail fragmentary sectional view illustrating the form of recess in each clutch member cooperating to provide a pocket adapted to receive the spring shown in Fig. 4.

Fig. 6 is a detail fragmentary sectional view illustrating one manner of forming a tapering recess in one of the clutch members.

In general, my improved spring clutch includes a pair of coaxial, relatively rotatable members, each having a recess and the recesses in both members meet end to end to form a pocket for a clutch spring, the pocket having an internal, cylindrical clutch surface. In the pocket is provided a clutch spring which is so connected at one end to one of the clutch members as to rotate therewith and be free from connection with the other, the spring having an external clutch surface to coact with the internal clutch surface of the pocket. A portion of one or both of said clutch surfaces in the vicinity of the meeting ends of the said members, is relatively hard to resist crushing or marring of the molecular structure thereof, while other portions of said surfaces are relatively softer so as to have a greater coefficient of friction. Thus upon a relative rotation in the proper direction, between said clutch members, the clutching action of the said last mentioned portions of said surfaces is not only more sensitive and positive but the other portions of said surfaces are rendered more highly resistant to wear so that a longer period of high efficiency in operation is attainable in a clutch of this kind.

Referring now in detail to that embodiment of the invention illustrated in the accompanying drawing and especially in Figs. 1, 2 and 3 thereof, 1 and 2 indicate two axially arranged, relatively rotative clutch members, each having a shaft 3 and 4 respectively. Each clutch member is cup shaped and is formed with a recess 5 and 6 respectively, which meet at their abutting ends 7 to form a clutch spring receiving pocket having an internal clutch surface 8. Preferably the clutch member 2 includes an annular flange 9 that surrounds the major portion of the clutch member 1 and a spring locking ring 10 so engages in a groove 11 in said flange as to hold said clutch members against relative endwise movement but permits of a relative rotative movement therebetween.

Within the pocket as defined by the recesses 5 and 6 of the respective clutch members is a clutch spring 12. Said spring in this particular instance is slightly radially oversize with respect to the pocket and has an external clutch surface 13 adapted for a gripping or clutching engagement with the clutch surface 8 of said clutch members. With such a structure, the spring is rotatable with one of said clutch members and is normally free from connection with the other clutch member. Thus in a relative movement between said clutch members in the proper direction, the spring is caused to expand and bring said clutch surfaces into intimate engagement to operatively connect said clutch members together.

In a clutch of this kind, several turns of the spring near each end have only the sole function of frictionally gripping the clutch surfaces 8 in the associated clutch members. The function of that turn of the spring at the middle thereof and between said end turns and which crosses the plane of the meeting ends 7 of the pockets, is to expand into intimate contact with the ends of each pocket and by reason of this function should be of such a molecular structure as to withstand the great strain imposed upon it in actual use.

To provide a clutch of this kind which approaches the ideal, one or both of said clutch surfaces adjacent the plane of said meeting ends 7 should be relatively hard whereby great resistance to molecular change is imparted thereto and those parts of said surfaces spaced from said plane should be relatively soft to provide a high coefficient of friction.

In treating a spring to produce these conditions in its clutching surface, it is not practical to harden the entire surface of the spring and then grind it because when such a hardened surface is ground, its coefficient of friction is reduced to the smallest degree and this is especially so if such a ground surface is to be engaged with a similarly hardened and ground surface.

I have found a practical method to harden the desired area of the clutch surface of the spring and in Fig. 3, I have illustrated a spring wherein the end portions $a$—$a$ of the spring are masked or suitably protected in any suitable manner and the mid-portion $b$ is treated in a manner by which it is materially hardened. This hardening may be carried out in any suitable manner as by treating the thus protected or masked spring in a nitriding furnace and then giving it the ammonia treatment. Again, this mid-portion $b$ of the spring may be given the desired surface by case hardening treatments after the spring has been ground to size. In Fig. 2 I have illustrated the hardened portion $b$ of said surface as including a number of turns 14 on each side of said plane 7.

I may also treat the surface 8 of the pocket in any suitable way to harden it as indicated at 15 in said Fig. 2 to coact with that part 14 of the clutch surface 13 of the spring and this can be carried out by masking portions thereof in a manner described in connection with the spring.

With such a structure, the end parts of the clutch surface of the spring are relatively soft as are associated parts of the clutch surface of the pocket and the mid-portion of the surface of the clutch spring is hardened as are those parts of the surface of the clutch member with which said mid-portion of the surface of the clutch spring engages. Thus in operation, the relatively softer end portions of said clutch surfaces have a high coefficient of friction while the associated harder mid-portions have a high resistance toward change in molecular structure.

Instead of treating portions of the clutch surfaces as described, I may harden the entire external clutch surface of the spring after grinding and then regrind the end portions $a^1$—$a^1$ to a taper as shown by the dotted comparison lines 16 in Fig. 4 thus leaving the mid-portion $b^1$ of said spring surface cylindrical. Thus in so regrinding the portions $a^1$—$a^1$ the hard surface is removed so that there is produced a clutch spring having a relatively hard mid-portion highly resistant to wear and relatively softer and tapering end portions having high co-efficient of friction.

With such a spring, the pockets 5 and 6 will have to be made to receive the taper ended spring and such an arrangement is shown in Fig. 5. To so make the recess in each clutch member, those portions adjacent the meeting ends of the pockets are cylindrical while the other portions taper toward the end wall of the associated recess.

To make such a tapering pocket, I may first grind it with a cylindrical part 17 near its open end and with a taper 18 at its other end as shown in Fig. 6. This surface is then hardened and the part 18 is reground to another taper as indicated by the dotted line 19 so as to receive one end part $a^1$ of a spring such as shown in Fig. 4.

A spring clutch embodying the features above described is ideal for its intended purpose in that wear is materially reduced if not entirely eliminated at that part of the spring which crosses from one pocket to the other and this without sacrificing the desired high coefficient of friction desired at the ends.

Such a spring may embody a less number of turns than are found in springs now used for a similar purpose and still have the same holding powers because the end turns would be building up their frictional holding much more rapidly from turn to turn starting from the end due to their relatively greater coefficient of friction.

While in describing my invention, I have referred in detail to the form, arrangement and construction of the various parts, as well as to the manner of forming them, the same is to be considered as illustrative only so that I do not wish to be limited thereto except as may be specifically set forth in the appended claims.

I claim as my invention:—

1. In combination with two relative rotatable members defining a clutch surface, a coil spring rotatable with one of said members and normally free from connection with the other member, whereby said members are free to rotate relatively, said spring having a clutch surface to engage and grip the first mentioned clutch surface upon a change in diameter of said spring produced in a relative rotation between said members in one direction, one of said surfaces being relatively soft in part to provide a high coefficient of friction and being relatively hard in another part to provide a high resistance to wear.

2. In combination with two relative rotatable members defining a clutch surface, a coil spring rotatable with one of said members and normally free from connection with the other member, whereby said members are free to rotate relatively, said spring having a clutch surface to engage and grip the first mentioned clutch surface upon a change in diameter of said spring produced in a relative rotation between said members in one direction, said spring being so formed that a part of its clutch surface is relatively soft to produce a high coefficient of friction and is relatively hard in another part to provide a high resistance to wear.

3. In combination with two relatively rotatable members, each having a recess and which recesses meet to coact and form a clutch spring receiving pocket having an internal clutch surface, a coil spring in said pocket and rotatable with one of said members and normally free from connection with the other member, whereby said members may rotate relatively, said spring having an external clutch surface to engage and grip said first mentioned clutch surface upon a radial expansion of said spring produced in a relative rotation between said members in one direction, one of said surfaces having a part adjacent the plane of the meeting ends of said recesses formed for a high resistance to a crushing action of its molecular structure and another part spaced from said plane formed for a high coefficient of friction.

4. In combination with two relatively rotatable members, each having a recess and which recesses meet to coact and form a clutch spring receiving pocket having an internal clutch surface, a coil spring in said pocket and rotatable with one of said members and normally free from connection with the other member, whereby said members may rotate relatively, said spring having an external clutch surface to engage and grip said first mentioned clutch surface upon a radial expansion of said spring produced in a relative rotation between said members in one direction, one of said surfaces having a middle part adjacent and on both sides of the plane of the meeting ends of said recesses formed for a high resistance to a crushing action of its molecular structure and end parts formed for a high coefficient of friction.

5. In combination with two relatively rotatable members, each having a recess and which recesses meet to coact to form a clutch spring receiving pocket having an internal clutch surface, a coil spring in said pocket and rotatable with one of said members and normally free from connection with the other member, whereby said members may rotate relatively, said spring having an external clutch surface to engage and grip said first mentioned clutch surface upon a radial expansion of said spring produced in a relative rotation between said members in one direction, one of said surfaces having a relatively hard part adjacent the plane of the meeting ends of said recesses and relatively softer parts spaced from said plane.

6. In combination with two relatively rotatable members, each having a recess and which recesses coact to form a clutch spring receiving pocket having an internal clutch surface, a coil spring in said pocket and rotatable with one of said members and normally free from connection with the other member, whereby said members may rotate relatively, said spring having an external clutch surface to engage and grip said first mentioned clutch surface upon a radial expansion of said spring produced in a relative rotation between said members in one direction, said surface of said spring having a relatively hard central portion adjacent the plane of said meeting ends and relatively softer end portions.

7. In combination with two relative rotatable members, defining a clutch surface, a coil spring rotatable with one of said members and normally free from connection with the other member, whereby said members are free to rotate relatively, said spring having a clutch surface to engage and grip the first mentioned clutch surface upon a change in diameter of said spring produced in a relative rotation between said members in one direction, both of said surfaces each being formed with a part having a high coefficient of friction and each being formed with another part having a high resistance to a crushing action of its molecular structure.

8. In combination with two relatively rotatable members, each having a recess and which recesses meet to coact and form a clutch spring receiving pocket having an internal clutch surface, a coil spring in said pocket and rotatable with one of said members and normally free from connection with the other member, whereby said members may rotate relatively, said spring having an external clutch surface to engage and grip said first mentioned clutch surface upon a radial expansion of said spring produced in a relative rotation between said members in one direction, each of said clutch surfaces having a relatively hard part adjacent the plane of the meeting ends of said recesses and a relatively softer part to each side of said relatively harder part.

9. A spring for use in a spring clutch comprising a plurality of spring turns formed to provide a clutch surface, a part of which is relatively hard and another part of which is relatively soft.

10. A spring for use in a spring clutch comprising a plurality of spring turns formed to provide an external clutch surface, a part of which is relatively harder than another part thereof.

11. A spring for use in a spring clutch comprising a plurality of spring turns formed to provide an external clutch surface which is harder at its midportion than it is at its end portions.

12. In a spring clutch, two relatively rotatable members coacting to provide a clutch surface for engagement by a clutch spring, said clutch surface being relatively harder in one part than in another part.

13. In a spring clutch, two relatively rotatable members coacting to provide an internal surface for engagement by a clutch spring, said internal clutch surface being relatively harder in one part than in another part.

14. In a spring clutch, two relatively rotatable clutch members, each having a recess and which recesses meet to form a clutch spring pocket having an internal clutch surface which is harder in that part adjacent the plane of said meeting ends and is softer in other parts spaced therefrom.

WILLIAM CARLETON STARKEY.